United States Patent
Lee et al.

(10) Patent No.: US 8,890,855 B1
(45) Date of Patent: Nov. 18, 2014

(54) PORTABLE DEVICE AND CONTROLLING METHOD THEREFOR

(71) Applicant: LG Electronics Inc., Seoul (KR)

(72) Inventors: Kunwoo Lee, Seoul (KR); Jin Kim, Seoul (KR); Jihoon Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/955,936

(22) Filed: Jul. 31, 2013

Related U.S. Application Data

(60) Provisional application No. 61/808,237, filed on Apr. 4, 2013.

(30) Foreign Application Priority Data

Jul. 4, 2013 (KR) ........................ 10-2013-0078359

(51) Int. Cl.
*G06F 3/033* (2013.01)
*G06F 3/0482* (2013.01)
*G06F 3/0354* (2013.01)

(52) U.S. Cl.
CPC .......... *G06F 3/0482* (2013.01); *G06F 3/03545* (2013.01)
USPC .......................................... 345/179; 345/156

(58) Field of Classification Search
USPC ....................... 345/156, 179–183; 178/18.01, 178/19.01–19.07
See application file for complete search history.

(56) References Cited

U.S. PATENT DOCUMENTS

| | | | |
|---|---|---|---|
| 7,097,457 B2 | 8/2006 | Kajino et al. | |
| 8,280,461 B2 | 10/2012 | Williams | |
| 2007/0030258 A1* | 2/2007 | Pittel et al. | ..................... 345/179 |
| 2007/0038538 A1* | 2/2007 | Silverbrook et al. | ........... 705/35 |
| 2007/0211042 A1 | 9/2007 | Kim et al. | |
| 2008/0001078 A1* | 1/2008 | Pittel et al. | ................. 250/252.1 |
| 2009/0115745 A1 | 5/2009 | Chuang et al. | |
| 2011/0090181 A1 | 4/2011 | Maridakis | |
| 2012/0086629 A1 | 4/2012 | Thorn | |
| 2012/0244915 A1 | 9/2012 | Hawkins et al. | |
| 2013/0046397 A1 | 2/2013 | Fadell et al. | |

* cited by examiner

*Primary Examiner* — Ricardo L Osorio
(74) *Attorney, Agent, or Firm* — Birch, Stewart, Kolasch & Birch, LLP

(57) ABSTRACT

A portable device including a stylus unit; a display unit configured to display an image and to sense an input of the stylus unit; a housing unit configured to accommodate the stylus unit; and a processor configured to provide a first menu interface corresponding to a first length when the stylus unit is pulled out from the housing unit and the pulled out length is less than a first length, navigate first menus provided by the first menu interface according to a rotation of the stylus unit when the rotation is sensed while the first menu interface is provided, and select or execute a menu of the first menus according to the navigating of the first menus when the stylus unit is pulled out from the housing unit and the pulled out length is more than the first length.

20 Claims, 5 Drawing Sheets

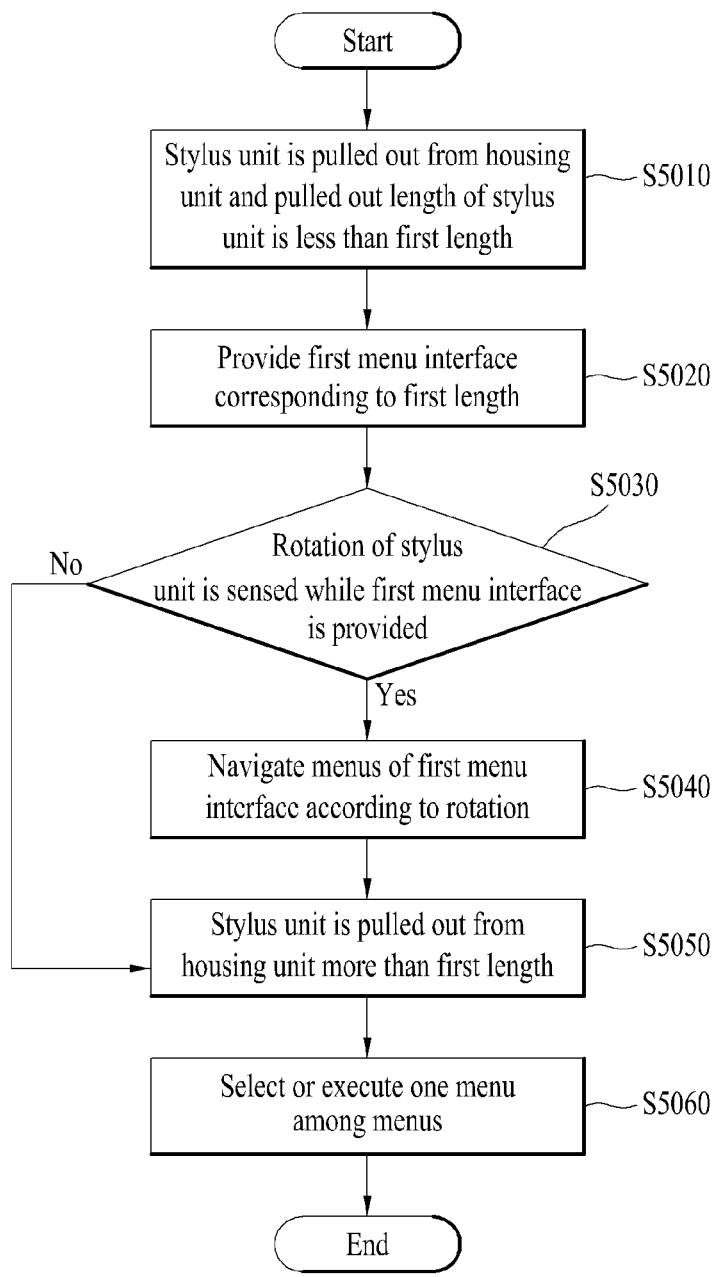

PORTABLE DEVICE AND CONTROLLING METHOD THEREFOR

Pursuant to 35 U.S.C. §119(e), this application claims the benefit of U.S. Provisional Application No. 61/808,237, filed on Apr. 4, 2013 and pursuant to 35 U.S.C. §119(a), the benefit of Korean Patent Application No. 10-2013-0078359, filed on Jul. 4, 2013, which are hereby incorporated by reference as if fully set forth herein.

BACKGROUND OF THE INVENTION

1. Field of the Invention

The present specification relates to a portable device equipped with a stylus unit, and more particularly, to a portable device controlling a menu interface according to a rotation angle and a length of a stylus unit pulled out from the portable device and method of controlling therefor.

2. Discussion of the Related Art

Recently, as a display panel capable of sensing a touch input has been disseminated, a touch input of a user has been enabled to be sensed by a device. And, the device can sense an input performed by a stylus unit corresponding to a means for a more delicate and precise touch input as well. The stylus unit is inserted in the inside of the device in consideration of portability and can be used in a manner of being separated from the device if necessary. Yet, in order to set an input environment of the stylus unit, there exist inconvenience of setting the input environment by giving a separate touch input or giving a separate input in a manner of separating the stylus unit from the device.

SUMMARY OF THE INVENTION

Accordingly, the present specification is directed to an apparatus and method thereof that substantially obviate one or more problems due to limitations and disadvantages of the related art.

According to one embodiment, an object of the present specification intends to provide a device navigating a menu interface according to a rotation angle of the stylus unit and a method of controlling therefor.

According to a different embodiment, another object of the present specification intends to provide a device providing a menu interface according to a length of a stylus unit being pulled out from a portable device and a method of controlling therefor.

According to a different embodiment, another object of the present specification intends to provide a device providing a menu interface according to a type of an application currently executed together with a length of a stylus unit being pulled out from a portable device and a method of controlling therefor.

According to a different embodiment, another object of the present specification intends to provide a device providing a menu interface according to a length of a stylus unit being pulled out, which corresponds to a menu configured to set an input environment of the stylus unit and a method of controlling therefor.

According to a different embodiment, another object of the present specification intends to provide a device providing an auditory or tactile feedback in response to a rotation of a stylus unit and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a portable device, comprising: a stylus unit, which is an input means for the portable device; a display unit configured to display an image and to sense an input of the stylus unit; a housing unit configured to accommodate the stylus unit; a sensor unit configured to sense a pulled out length of the stylus unit from the housing unit and a rotation angle of the stylus unit; and a processor configured to control the stylus unit, the display unit, the housing unit, and the sensor unit, wherein the processor is further configured to: provide a first menu interface corresponding to a first length when the stylus unit is pulled out from the housing unit and the pulled out length is less than the first length, navigate first menus provided by the first menu interface according to a rotation of the stylus unit when the rotation is sensed while the first menu interface is provided, and select or execute a menu of the first menus according to the navigating of the first menus when the stylus unit is pulled out from the housing unit and the pulled out length is more than the first length.

Accordingly, the present specification provides the following effects and/or advantages.

According to one embodiment, by making a device select or execute a menu in connection with an operation of separating a stylus unit from a device, a user can select or execute a preferred menu only by an operation of pulling out the stylus unit without a separate operation of selection or execution.

According to a different embodiment, by making a device navigate menus provided by a menu interface according to a rotation angle of a stylus unit, a more intuitive and convenient method of controlling an interface can be provided.

According to a different embodiment, since a kind of a menu interface varies according to a type of an application currently executed, a device can provide an appropriate menu interface according to a situation.

A more detail effect and/or advantage of the invention shall be described in detail in the following description.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a flowchart of a device.

DETAILED DESCRIPTION OF THE INVENTION

Figure 1:
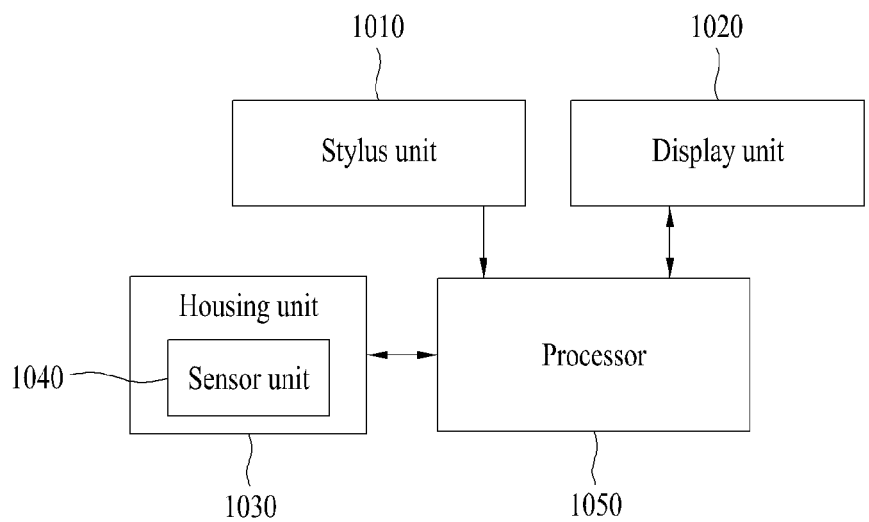
FIG. 1 is a block diagram of a device according to one embodiment.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Moreover, although embodiments are explained in detail with reference to the attached drawings and the contents written on the attached drawings, a scope intended to claim may be non-limited or non-restricted by the embodiments.

As an electronic device manufacturing technology has been developed, a miniaturization on digital devices is being made. The present specification is related to a portable electronic device. In the following description, the portable electronic device is commonly called a portable device. The portable device means a various electronic devices having mobility and may include such an electronic device as a cellular phone, a PDA (personal digital assistants), a notebook, a tablet PC, a MP3 player, a CD player, a DVD player, a HMD (head mounted display), a smart watch, a watch phone, and the like. In the following description, the portable device may be called a device in a manner of being abbreviated.

As a touch sensor has been developed, the portable device is usually equipped with a display panel capable of sensing a touch input. The device senses a touch input on the display panel of a user and can execute a command corresponding to the sensed touch input. In this case, the user can give the touch input using a stylus unit as well as a part of a body of the user (e.g., a finger of the user). In this case, the stylus unit may indicate an input device used for writing a letter or drawing a line for the device. Since the stylus unit is structured in a form of a pen, the stylus unit enables the user to perform a more delicate and precise touch input, which cannot be done by a part of a body of the user. For instance, if a more exquisite and accurate touch input is required like a case of drawing a picture or editing an image using the device, the user can perform a more elaborate touch input by using the stylus unit as a writing tool such as a pen or a writing brush.

In order to secure mobility and portability of the stylus unit, the device can accommodate the stylus unit in the inside of the device. The user can use the stylus unit in a manner of separating the stylus unit from the device as necessary. Devices equipped with a conventional stylus unit did not perform any specific operation in case that the conventional stylus unit is separated from the device. Yet, the device of the present specification provides a more easy-to-use and convenient method of controlling the device in a manner of linking an operation of being separated from the device of the stylus unit to an operation of menu selection. Hence, by making a user select a menu, which is needed to be separately but mandatorily selected after the stylus unit is separated from the device, in advance along with separation of the stylus unit, a more convenient method of controlling the device can be provided. In the following description, various embodiments of the device equipped with the stylus unit shall be described in detail.

FIG. 1 is a block diagram of a device according to one embodiment. Referring to FIG. 1, the device can include a stylus unit 1010, a housing unit 1030, a sensor unit 1040, a display unit 1020, and a processor 1050.

The stylus unit 1010 may indicate an input means for the device. More specifically, the stylus unit 1010 may indicate the input means for a display unit 1020 inserted in the device. The stylus unit 1010 may correspond to a form of a writing tool such as a pen, a brush, or the like and can be used when a more delicate and precise touch input is required. The stylus unit 1010 is inserted in the inside of the device and can be used in a manner of being separated from the device if necessary.

The housing unit 1030 can store the stylus unit 1010. The housing unit 1030 can sense a pulled out length of the stylus unit 1010 from the device and/or a rotation angle of the stylus unit 100 using at least one sensor. In this case, one or a plurality of sensors configured to sense the length of the stylus unit 1010 pulled out from the device and the rotation angle are commonly called a sensor unit 1040. The sensor unit 1040 can include at least one selected from the group consisting of a depth sensor, a touch sensor, an infrared/ultraviolet sensor, a position detection sensor, an angular velocity sensor, a proximity sensor, a gyro sensor, a gyroscope sensor, and a strain gage sensor. The aforementioned sensors may be included in the device as a separate element or may be included in the device in a manner of being combined with at least one element. Moreover, the sensor unit 1040 can transmit a sensed result obtained using the aforementioned sensor to the processor 1050.

The sensor unit 1040 can measure an accurate length of the stylus unit pulled out from the housing unit. Or, the sensor unit 1040 can obtain an approximate length of the stylus unit 1010 by judging whether the length of the stylus unit pulled out from the housing unit is less than a specific length or greater than the specific length. And, the sensor unit 1040 can measure an angle of which the stylus unit 1010 rotated in the housing unit 1030 or an angular velocity. Or, the sensor unit 1040 can obtain an approximate angle by judging whether the rotated angle is less than a specific angle or greater than the specific angle. In particular, in the present specification, the length and the angle obtained by the sensor unit 1040 not only mean an accurate length and angle but also indicate a practical length and angle and permit an error of a prescribed range.

The display unit 1020 can display an image. More specifically, the display unit 1020 can display an execution image of an application executed by the processor 1050. In the present specification, the image may indicate such images as a still image displayable in the display unit 1020, a video, a text, or various images capable of being visually represented including the still image, the video, and the text.

And, the display unit can sense a touch input on the display unit 1020 in a manner of being equipped together with a touch sensor unit (not depicted). More specifically, the display unit 1020 can sense the touch input of a user using at least one sensing means installed in the device. As one embodiment, the at least one sensing unit may include such various sensing means as a touch sensor, a fingerprint sensor, a motion sensor, a proximity sensor, a magnetic field sensor, a camera sensor, a pressure sensor, and the like. The aforementioned various sensing means are commonly called a touch sensor unit and the aforementioned sensors may be included in the device as a separate element or can be included in the device in a manner of being integrated into at least one element.

The display unit 1020 can sense various touch inputs of a user via the touch sensor unit. More specifically, the touch sensor unit can sense such various contact or non-contact touch inputs as a long-press touch input of a user, a short-press touch input, a hovering input, a flicking touch input, or the like. In particular, the touch sensor unit senses a touch input inputted by such various touch input tools as a touch pen, a stylus unit 1010, a stylus pen, and the like and can deliver a sensed result to the processor 1050.

The processor 1050 can execute various applications by processing an internal data of the device. And, the processor 1050 can control an execution of an application executed in the device based on a control command. And, the processor 1050 controls each of the units of the aforementioned device and can control data transmission/reception between the units. And, if an input signal is sensed via the aforementioned sensor units, the processor 1050 can execute a command corresponding to the input signal.

In particular, in the present specification, the processor 1050 can control a menu interface according to a length of the stylus unit 1010 pulled out from the device and a rotation angle of the stylus unit 1010, which are received from the sensor unit. More specifically, the processor 1050 can provide the menu interface corresponding to the length of the stylus unit pulled out from the device according to the length of the stylus unit 1010 pulled out from the device. In the present specification, the menu interface may indicate an interface making the device to be controlled in a manner of selecting one of a plurality of provided menus instead of using an explicit command in case that a user controls the device. The menu interface can provide various menus according to a type of the menu interface.

In case that a rotation of the stylus unit 1010 is additionally sensed in the middle of providing the menu interface, the processor 1050 can navigate menus provided by the menu interface in response to the rotation. Moreover, in case that the stylus unit 1010 is additionally pulled out from the device or the stylus unit stops rotating due to an excess of a predetermined time, the processor 1050 can select one menu among the menus provided.

In the following description, if each step or operation performed in the device is started or progressed by a user input, a process of generating an input signal according to the user input may include the explanation on the aforementioned process although it is not duplicately explained. And, it can be represented as the processor controls the device or at least one unit included in the device according to the user input. The processor 1050 and the device can be explained in a manner of being equated with each other.

Meanwhile, FIG. 1 is a block diagram according to one embodiment. Blocks represented in a manner of being separated indicate the logically distinguished elements of the device. Hence, the elements of the aforementioned device may be equipped with a single chip or a plurality of chips according to the design of the device.

Figure 2:
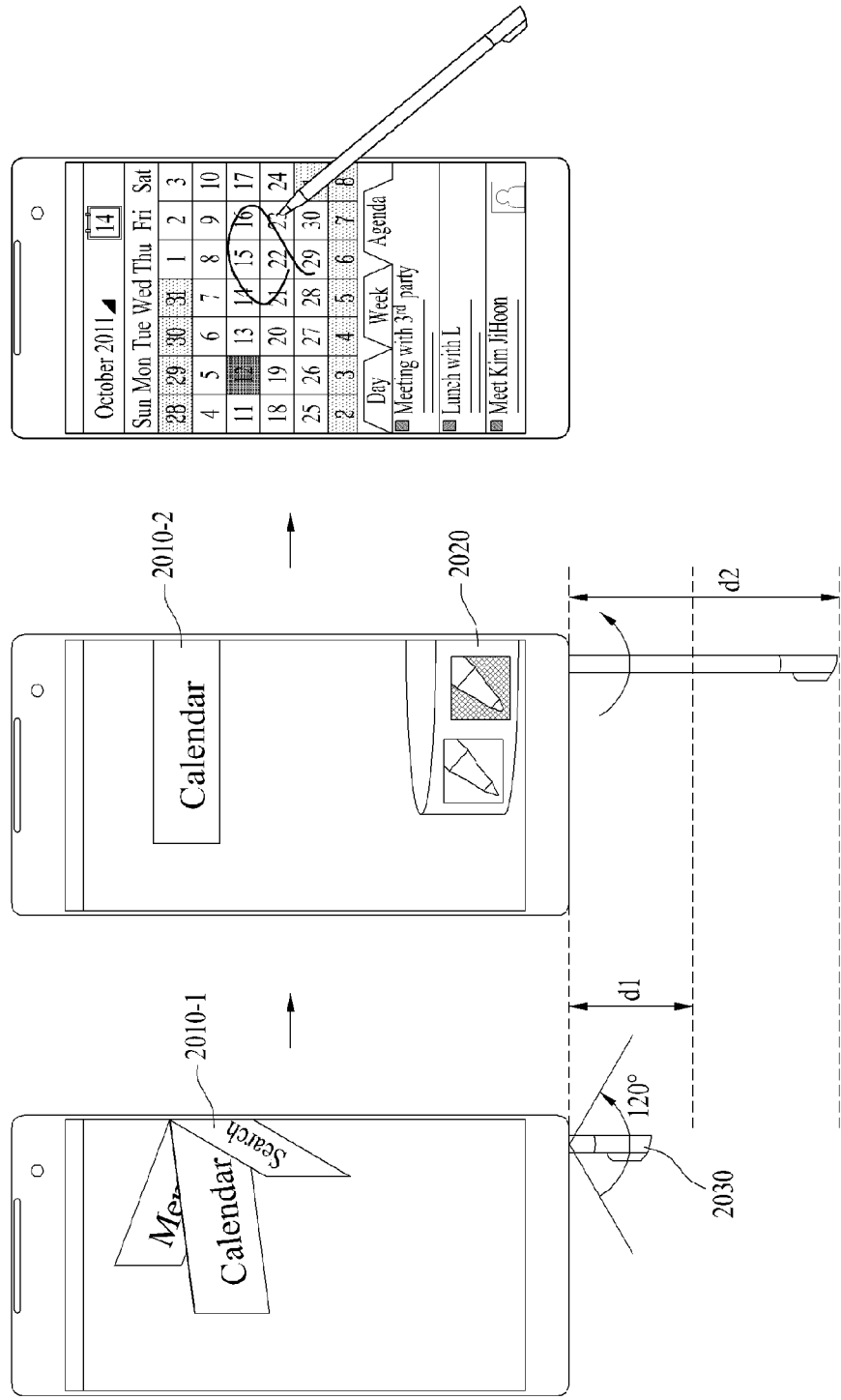
FIG. 2 is a diagram of one embodiment of a device of which a menu interface is controlled according to a length of a stylus unit pulled out from the device and a rotation angle of the stylus unit.

FIG. 2 is a diagram of one embodiment of a device of which a menu interface is controlled according to a length of a stylus unit pulled out from the device and a rotation angle of the stylus unit.

The device can provide various menu interfaces according to the pulled out length of the stylus unit 2030 from the device. More specifically, the device can provide various menu interfaces according to the pulled out length of the stylus unit 2030 from the housing unit. For instance, if the stylus unit is pulled out from the housing unit and the pulled out length of the stylus unit 2030 is less than a first length (d1), the device can provide a first menu interface 2010-1 corresponding to the first length (d1). Or, if the stylus unit 2030 stops due to an excess of a predetermined time after being pulled out from the housing unit as much as the first length (d1), the device can provide the first menu interface 2010-1. In FIG. 2, the first menu interface 2010-1 corresponds to a menu interface for executing an application. Meanwhile, if the stylus unit 2030 is pulled out from the housing unit and the pulled out length of the stylus unit 2030 is less than the first length (d1) in a locked state of the device, the display can switch from the locked state of the device to a unlocked state.

In case that the device currently provides the first menu interface 2010-1, a user can navigate a plurality of menus provided by the first menu interface 2010-1 in a manner of rotating the stylus unit 2030. In other word, the user can explore a plurality of the menus provided by the first menu interface 2010-1 by rotating the stylus unit 2010, which is pulled out from the device and the pulled out length is less than the first length (d1), on an axis of a direction of being pulled out. The device can explore a plurality of the menus in response to a sensed rotation angle of the stylus unit 2030. For instance, a plurality of the menus rotates together according to the rotation of the stylus unit 2030 or can be sequentially displayed in a manner of being rotated. Or, the device can explore a plurality of the menus in response to a sensed rotation angular velocity of the stylus unit 2030. This can be variously set according to a UI design of the device, a design purpose, a user configuration, and the like and various modifications can be made under the permission of those skilled in the art.

Moreover, if a rotation of the stylus unit 2030 is sensed, the device can provide an auditory or a tactile feedback in response to the rotation. For instance, on every 90 degree angle rotation of the stylus unit 2030, the device can indicate a rotation angle or an extent of rotation in a manner of providing a vibration feedback to a user.

Subsequently, the device can sense a stop of rotation of the stylus unit 2030. If the stylus unit 2030 stops rotating, the device can display a menu 2010-2 corresponding to a changed rotation angle of the stylus unit 2030. In particular, if the rotation of the stylus unit 2030 stops due to an excess of a predetermined time, the device can display the menu 2010-2 corresponding to a variation of the rotation angle of the stylus unit 2030. For instance, as depicted in the diagram, the device can sequentially display a menu one by one on every 120 degree angle rotation of the stylus unit 2030. In this case, in case that the firstly provided menu corresponds to a menu for executing a search application, if a 120 degree angle rotation of the stylus unit 2030 is sensed, the device can display a menu for executing a calendar application, which is a following menu of the menu for executing the search application. The menus displayed according to the rotation can include such various graphic user interfaces as an icon, an image, a text indicating information on each of the menus.

Subsequently, if the stylus unit 2030 is pulled out from the device and the pulled out length is more than the first length (d1), the device can select and/or execute one menu 2010-2 of a plurality of the menus provided by the first menu interface 2010-1. More specifically, if the stylus unit 2030 stopped rotating due to an excess of a predetermined time, the device can select one menu 2010-2 of a plurality of the menus provided by the first menu interface 2010-1. Moreover, if the stylus unit 2030 is pulled out from the device and the pulled out length is more than the first length (d1), the device can execute the selected menu 2010-2. In particular, if a plurality of the menus provided by the first menu interface 2010-1 is sequentially displayed according to the rotation of the stylus unit 2030, a menu displayed, when the pulled out length is more than the first length (d1), can be selected and/or executed. Meanwhile, if one menu is selected as the stylus unit 2030 is pulled out from the device and the pulled out length is more than the first length, the selected menu can be executed in case that the stylus unit 2030 is completely separated from the device.

Moreover, in case that the device provides a plurality of the menu interfaces, the reference number of a pulled out length of the stylus unit 2030 from the device may correspond to plural numbers. In the present diagram, the device providing 2 menu interfaces is depicted as a reference. Hence, in the present embodiment, the device can additionally provide a second length (d2) longer than the aforementioned first length (d1) as the reference of the length of the stylus unit 2030 pulled out from the device. In particular, in case that the stylus unit 2030 is pulled out from the device and the pulled out length is more than the first length (d1) and less than the second length (d2), the device can provide a second menu interface 2020 corresponding to the second length (d2). In this case, the device can display each of the menu interfaces in a position corresponding to a position of the stylus unit 2030 situating at the inside of the device to intuitively inform a user that the menu interface can be controlled according to the length of the stylus unit 2030 pulled out from the device. For instance, as depicted in FIG. 2, the device can display the first menu interface 2010-1 in a top part of the display unit and can display the second menu interface 2020 in a bottom part of the display unit in response to the length of the stylus unit 2030 pulled out from the device.

In the present diagram, a menu interface capable of selecting a type of a pen of the stylus unit 2030 is depicted as the second menu interface 2020. In this case, if a rotation of the stylus unit 2030 is additionally sensed, as mentioned in the foregoing description in relation with the first menu interface 2010-1, the device can navigate a plurality of the menus provided by the second menu interface 2020. And, in case that the stylus unit 2030 is pulled out from the device and the pulled out length of the stylus unit 2030 is more than the second length (d2), the device can select and/or execute one menu of a plurality of the menus. In particular, the control operation of the device related to the second menu interface 2020 corresponds to the aforementioned control operation in the first menu interface 2010-1. Regarding this, it shall be described in more detail in FIG. 4. Meanwhile, for clarity, following description is explained on the basis of the device providing the menu interface of 2 steps.

After a menu is selected and/or executed by the movement of the stylus unit 2030, if the stylus unit 2030 is completely separated from the device, the device can directly provide a user with the selected and/or executed menu. In particular, after the stylus unit 2030 is separated from the device, the user can precedently select a menu intended to use with an action of pulling out the stylus unit 2030 from the device only without any separate input. In particular, after the stylus unit 2030 is separated from the device, the user can use the stylus unit 2030 in a preferred menu or a mode without any separate input. Hence, the device can provide the user with an easier and more intuitive menu control interface.

If the stylus unit 2030 is completely separated from the device, information on the menu, which is selected and/or executed while the stylus unit is separated from the device, can be provided. For instance, in case that a user selects a calendar application execution menu in the first menu interface 2010-1, if the stylus unit 2030 is completely separated from the device, the device can display an informing message such as 'calendar application is executed'. If a plurality of menu interfaces is provided according to embodiment, the information on a plurality of the menu interfaces can be displayed as well.

Meanwhile, as an additional embodiment, since the device provides a menu interface according to the pulled out length of the stylus unit 2030, a user can modify the menu selected in an upper menu interface by controlling the pulled out length from the device. For instance, in case that a user intends to modify a first menu selected in the first menu interface 2010-1 into a second menu, the user can push the pulled out stylus unit 2030 into the device again. In this case, if the pulled out length of the stylus unit 2030 from the device is less than the first length (d1), the device can provide the first menu interface 2010-1 again. In this case, the user can modify the menu in a manner of selecting the second menu with a method identical to the method of selecting the first menu.

Figure 3:
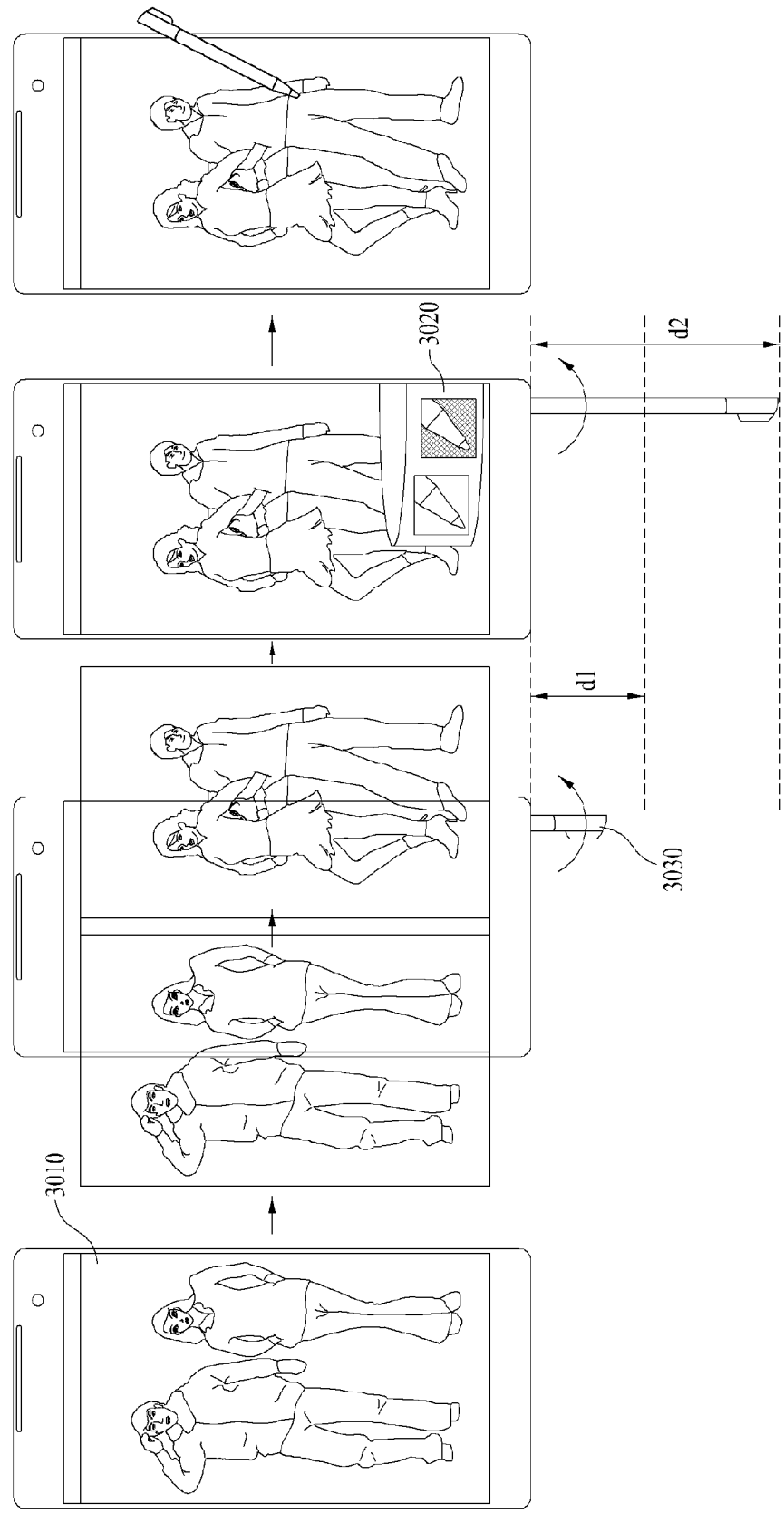
FIG. 3 is a diagram of one embodiment of a device of which a menu interface is controlled according to a length of a stylus unit pulled out from the device and a rotation of the stylus unit in case that a gallery application is currently executed.

FIG. 3 is a diagram of one embodiment of a device of which a menu interface is controlled according to a pulled out length of a stylus unit from the device and a rotation of the stylus unit in case that a gallery application is currently executed.

A kind of menu interfaces provided according to a pulled out length of the stylus unit from the device can be determined by a type of an application currently being executed. In other word, the kind of menu interfaces can be determined by the type of the application currently displayed. For instance, if the stylus unit is pulled out and the pulled out length is less than the first length (d1) while a gallery application 3010 is executed, the device can navigate pictures provided by the gallery application 3010 according to a rotation of the stylus unit. In particular, in the present embodiment, the menu provided by the first menu interface may correspond to the pictures provided by the gallery application 3010

Moreover, if the stylus unit is additionally pulled out, the device can provide a second menu interface, which is dependent or independent of the first menu interface. For instance, in case that the second menu interface is independent of the first menu interface, the device can provide a menu interface 3020 for configuring a type of a pen of the stylus unit, which is independent of the gallery application execution menu 3010, as the second menu interface. As a different embodiment, in case that the second menu interface is dependent of the first menu interface, the second menu interface in the diagram may correspond to a menu interface for determining resolution or a size of a picture selected in the first menu interface. In particular, the first menu interface and the second menu interface can be independent or dependent of each other. This can be variously configured according to a design purpose of the device, a type of a currently executed application, and the like and may be non-limited to the aforementioned embodiments. Additionally, a type of the second menu interface may be dependent of the menu selected in the first menu interface. Regarding this, it shall be described in detail in relation to FIG. 4.

As mentioned in the foregoing description, if a menu is selected in each of the menu interfaces provided by the device and if the stylus unit is completely separated from the device, a user can use the device based on the selected menu. For instance, as depicted in the diagram, if a picture to be edited is selected in the first menu interface and if the stylus unit is completely separated from the device after a type of a pen of the stylus unit is determined in the second menu interface 3020, the device can edit the picture selected in the first menu interface with the type of the pen selected in the second menu interface 3020.

Meanwhile, at least one menu interface provided according to the pulled out length of the stylus unit from the device may correspond to a menu interface for configuring an input environment of the stylus unit. Since pulling out the stylus unit from the device can be seen as an intention of a user to use the stylus unit, configuring the input environment of the stylus unit in advance is performed to provide convenience to the user. The menu interface for configuring the input environment of the stylus unit can provide various menus to enable the menu interface to configure such various properties of a writing means as a line style of the stylus unit, a sort of a line, a type of a pen, a type of a nip, thickness of a line, color of a line, and the like and may be non-limited to the aforementioned embodiment.

Figure 4:
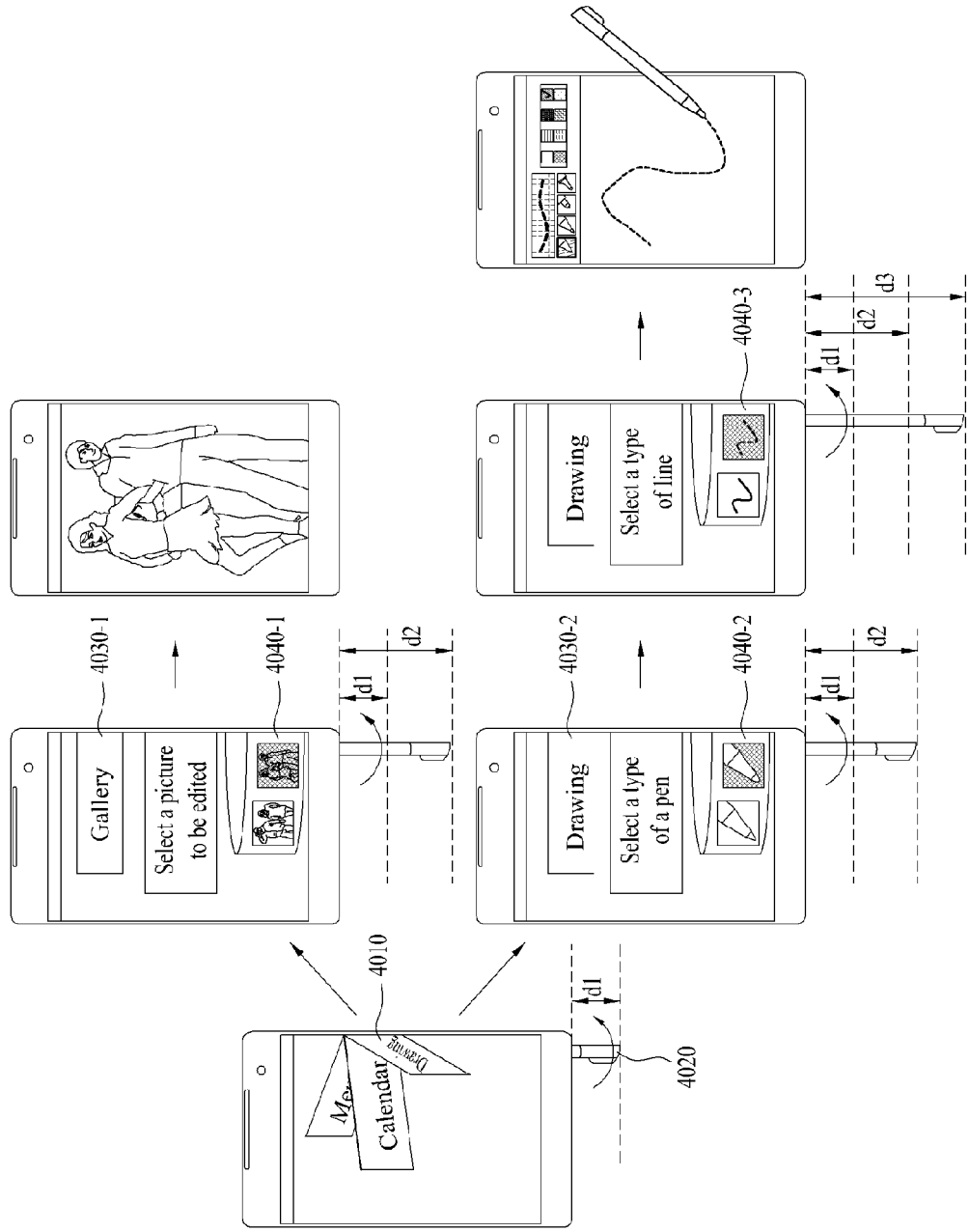
FIG. 4 is a diagram of one embodiment of a device providing a sub menu interface according to a menu selected in an upper menu interface.

FIG. 4 is a diagram of one embodiment of a device providing a sub menu interface according to a menu selected in an upper menu interface. In the present embodiment, the upper menu interface may indicate the first menu interface 4010 corresponding to the first length. Moreover, the sub menu interface may indicate the second menu interface corresponding to the second length.

The device can provide the sub menu interface according to a menu selected in the upper menu interface 4010. As one embodiment, the device may or may not provide the sub menu interface according to the menu selected in the upper menu interface 4010. In particular, whether the sub menu interface is provided or not can be determined by the menu selected by a user in the upper menu interface 4010. More specifically, if the menu selected in the upper menu interface 4010 requires an additional menu selection, the device can provide the sub menu interface for the additional menu selection. For instance, if a gallery application execution menu 4030-1 is selected in the upper menu interface 4010, the device can provide a picture selection menu interface 4040-1 capable of selecting a picture to be edited as the sub menu interface. The user navigates the pictures via the picture selection menu interface 4040-1 and can select the picture intended to be modified.

As mentioned in the foregoing description, since the device determines whether the sub menu interface is provided or not according to the menu selected in the upper menu interface 4010, the numbers of steps of the menu interfaces capable of being provided by the device may be flexible. For instance, as depicted in the diagram, if the gallery application execution menu 4030-1 is selected, one sub menu interface 4040-1 configured to select a picture to be edited can be provided. Yet, if a drawing application execution menu 4030-2 is selected, the device can sequentially provide 2 sub menu interfaces 4040-2/4040-3 selecting a type of a pen and a sort of a line, respectively. In case that a plurality of sub menu interfaces 4040-2/4040-3 are provided, each of the sub menu interfaces 4040-2/4040-3 can correspond to the length of the stylus unit pulled out from the device. Hence, in case that the stylus unit 4020 is pulled out as long as a predetermined length, the device can provide a sub menu interface corresponding to the predetermined length.

And, as a different embodiment, the device can determine a type of the sub menu interface according to the menu selected in the upper menu interface 4010. In other word, the type of the sub menu interface may be dependent of the menu selected in the upper menu interface 4010. For instance, if the drawing application execution menu 4030-2 is selected in the upper menu interface 4010, the sub menu interface may correspond to the menu interface 4040-2 capable of selecting the type of the pen of the stylus unit 4020 to be used in the drawing application. If the type of the pen is selected via the sub menu interface, the device can provide an additional sub menu interface 4040-3 capable of a sort of a line based on the selected type of the pen. In particular, the type of the sub menu interface can be determined based on the menu selected in the upper menu interface 4010.

FIG. 5 is a flowchart of a device. In the present flowchart, detail explanation on a part similar or corresponding to the part of the explanation aforementioned in FIG. 1 to FIG. 4 is omitted.

First of all, the device can sense that the stylus unit is pulled out from the housing unit [S5010]. In particular, the device can detect whether the stylus unit is pulled out from the device and a pulled out length of the stylus unit is less than the first length.

If the stylus unit is pulled out from the device and the pulled out length is less than the first length, the device can provide the first menu interface corresponding to the first length [S5020]. The kind of the first menu interface can be determined by the application currently executed or the application currently displayed and detail explanation on this is identical to the aforementioned explanation described in relation to FIG. 3.

Subsequently, the device can judge whether a rotation of the stylus unit is sensed while the first menu interface is provided [S5030]. The rotation of the stylus unit can be sensed via a sensor unit of the housing unit in which the stylus unit is inserted and detail explanation on this is identical to the aforementioned explanation described in relation to FIG. 1.

In case that the rotation of the stylus unit is sensed while the first menu is provided, the device can navigate a plurality of menus provided by the first menu interface [S5040]. In particular, the device can navigate a plurality of the menus in response to the rotation of the stylus unit. In this case, the device can give various graphic effects and detail explanation on this is identical to the aforementioned explanation described in relation to FIG. 2. Moreover, the device can provide an auditory or a tactile feedback in response to the rotation of the stylus unit and the detail explanation on this is identical to the aforementioned explanation described in relation to FIG. 2 as well.

Yet, if the rotation of the stylus unit is not sensed, the device can enter a next step [S5050] in a manner of skipping a step of navigating the menus of the menu interface according to the rotation.

Subsequently, the device can detect that the stylus unit is pulled out from the housing unit and the pulled out length is more than the first length [S5050]. If the device senses that the stylus unit is pulled out and the pulled out length is more than the first length, the device can select or execute one menu of the menus provided by the first menu interface [S5060]. More specifically, if the stylus unit stops rotating due to an excess of the predetermined time, the device can select one menu of the menus provided by the first menu interface. Moreover, if the stylus unit is pulled out and the pulled out length is more than the first length, the device can execute the selected menu. The menu can be selected and/or executed according to the result navigated in the previous step. If the menus are not passing through the step of being navigated, a menu corresponding to a rotation angle 0 can be selected and/or executed. Or, a menu lastly selected and/or executed can be selected and/or executed. The detail explanation on this is identical to the aforementioned explanation described in relation to FIG. 2.

Yet, if the pulled out length is not more than the first length, the device can return to the step providing the first menu interface corresponding to the first length [S5020].

Meanwhile, in case that a plurality of the menus are provided according to the menu selected in the first menu interface or the type of the application currently executed, the device can provide an additional length reference. For instance, in case that a menu interface of 2 steps is provided, the device can additionally provide a second length as the length of the stylus unit pulled out from the device. In this case, the second menu interface can be provided when the stylus unit is pulled out from the device and the pulled out length is more than the first length and less than the second length. The detail explanation on this is identical to the aforementioned explanation described in relation to FIG. 2 and FIG. 3. Moreover, a type of a sub menu interface can be determined according to the menu selected in the upper menu interface and the detail explanation on this is identical to the aforementioned explanation described in relation to FIG. 4.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

And, the device and controlling method therefor may not limitedly apply to the composition and method of the aforementioned embodiments. The aforementioned embodiments can be configured in a manner of being selectively combined the whole of the embodiments or a part of the embodiments to achieve various modifications.

While the present specification has been described and illustrated herein with reference to the preferred embodiments thereof, it may be non-limited to the aforementioned specific embodiment and it will be apparent to those skilled in the art that various modifications and variations can be made therein without departing from the spirit and scope of the invention. Thus, it is intended that the technical idea and prospect of the present specification covers the modifications and variations of this invention.

And, it can be considered that an angle, a distance, and a length described in the present specification may indicate not only a precise value but also a practical angle, a distance, and a length in a prescribed range. In particular, the angle, the distance, and the length of the present specification may indicate a practical angle, distance, and length and a prescribed range of error can exist.

And, both an apparatus invention and a method invention are explained in the present specification and the explanation on the both of the inventions can be complementally applied, if necessary.

What is claimed is:

1. A portable device, comprising:
a stylus unit, which is an input means for the portable device;
a display unit configured to display an image and to sense an input of the stylus unit;
a housing unit configured to accommodate the stylus unit;
a sensor unit configured to sense a pulled out length of the stylus unit from the housing unit and a rotation angle of the stylus unit; and
a processor configured to control the stylus unit, the display unit, the housing unit, and the sensor unit,
wherein the processor is further configured to:
provide a first menu interface corresponding to a first length when the stylus unit is pulled out from the housing unit and the pulled out length is less than the first length,
navigate first menus provided by the first menu interface according to a rotation of the stylus unit when the rotation is sensed while the first menu interface is provided, and
select or execute a menu of the first menus according to the navigating of the first menus when the stylus unit is pulled out from the housing unit and the pulled out length is more than the first length.

2. The portable device of claim 1, wherein the processor is further configured to determine a type of the first menu interface according to a type of an application currently executed.

3. The portable device of claim 1, wherein the processor is further configured to:
provide a second menu interface corresponding to a second length when the stylus unit is pulled out from the housing unit and the pulled out length is more than the first length and less than the second length,
navigate second menus provided by the second menu interface according to the rotation when the rotation is sensed while the second menu interface is provided, and
select or execute a menu of the second menus according to the navigating of the second menus when the stylus unit is pulled out from the housing unit and the pulled out length is more than the second length.

4. The portable device of claim 3, wherein the second length is longer than the first length.

5. The portable device of claim 3, wherein the second menu interface corresponds to a sub menu interface of the first menu interface.

6. The portable device of claim 3, wherein the processor is further configured to determine a type of the second menu interface according to the selected or executed menu of the first menus.

7. The portable device of claim 3, wherein the first menu interface or the second menu interface corresponds to a menu interface configuring an input environment of the stylus unit.

8. The portable device of claim 1, wherein the processor is further configured to unlock a locked state of the portable device when the stylus unit is pulled out from the housing unit and the pulled out length is less than the first length in the locked state of the portable device.

9. The portable device of claim 1, wherein the processor is further configured to:
select the menu of the first menus provided by the first menu interface when the stylus unit stops rotating, and
execute the selected menu when the stylus unit is pulled out from the housing unit and the pulled out length is more than the first length.

10. The portable device of claim 1, wherein the processor is further configured to provide an auditory or a tactile feedback in response to the rotation of the stylus unit.

11. A method of controlling a portable device, comprising the steps of:
sensing whether a stylus unit is pulled out from a housing unit in which the stylus unit is inserted, wherein the stylus unit is an input means for the portable device;
providing a first menu interface corresponding to a first length when the stylus unit is pulled out from the housing unit and a pulled out length of the stylus unit is less than the first length;
navigating first menus provided by the first menu interface according to a rotation of the stylus unit when the rotation is sensed while the first menu interface is provided; and
selecting or executing a menu of the first menus according to the navigating of the first menus when the stylus unit is pulled out from the housing unit and the pulled out length is more than the first length.

12. The method of claim 11, further comprising the step of determining a type of the first menu interface according to a type of an application currently executed.

13. The method of claim 11, further comprising the steps of:
   providing a second menu interface corresponding to a second length when the stylus unit is pulled out from the housing unit and the pulled out length is more than the first length and less than the second length;
   navigating second menus provided by the second menu interface according to the rotation when the rotation is sensed while the second menu interface is provided; and
   selecting or executing a menu of the second menus according to the navigating of the second menus when the stylus unit is pulled out from the housing unit and the pulled out length is more than the second length.

14. The method of claim 13, wherein the second length is longer than the first length.

15. The method of claim 13, wherein the second menu interface corresponds to a sub menu interface of the first menu interface.

16. The method of claim 13, comprising the step of determining a type of the second menu interface according to the selected or executed menu of the first menus.

17. The method of claim 13, wherein the first menu interface or the second menu interface corresponds to a menu interface configuring an input environment of the stylus unit.

18. The method of claim 11, further comprising the step of unlocking a locked state of the portable device when the stylus unit is pulled out from the housing unit and the pulled out length is less than the first length in the locked state of the portable device.

19. The method of claim 11, the step of selecting or executing a menu of the first menus, comprising the steps of:
   selecting the menu of the first menus provided by the first menu interface when the stylus unit stops rotating; and
   executing the selected menu when the stylus unit is pulled out from the housing unit and the pulled out length is more than the first length.

20. The method of claim 11, further comprising the step of providing an auditory or a tactile feedback in response to the rotation of the stylus unit.

\* \* \* \* \*